UNITED STATES PATENT OFFICE
PTO – BOYERS, PA DUTY STATION

---

PAGE NOT AVAILABLE

PATENT NUMBER X5023 FOR THE ISSUE DATE 3/4/1828 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X5023

3-4-1828

Austin [illegible] and Thomas [illegible]
Letters Patent granted March 24th 1828.

The schedule referred to in these Letters Patent and making part of
the same containing a description in the words of the said Austin
[illegible] and Thomas [illegible] themselves of their improvement in the mode
of curing tobacco.

[illegible] improvement in the art of preparing tobacco to be cured [illegible] [illegible]
[illegible] and [illegible] the same by sticking, [illegible] and [illegible]
scaffolds, or so much thereof as may be found necessary in the judgm
of the manager to render it sufficiently yellow to be cured of the desired
colour, taking care in all cases not to suffer the tobacco to advance
too near putrescence, it is best to let it stand in the field until it is
fully ripe, and when it is cut, take it when about half limber,
[illegible] it together with the stalks [illegible] upwards and the leaves
on the ground, or on grass, dry leaves or straw spread on the ground
taking care not to crowd the tobacco so close or in such quantities as
to cause it to heat, this is called stocking, or [illegible], and is the
best mode for tobacco that is of a deep green colour or full of sap
when cut, it should be covered up in this situation if there be hot
sun, with green bushes or something that will answer the same
purpose, and remain, [illegible] twenty four to forty eight hours, if the weather
permits, then take it up, hang it on sticks and crowd it in low scaff[illegible]
so that a [illegible] of the ends of the leaves will lie on the ground, but [illegible]
[illegible] the ground should be covered with nice dry straw, unless
there be a natural coat of grass sufficient to keep the tobacco from the
dirt. The exposed parts of the tobacco should be covered as before, in
this situation it should remain if the weather permits until it
is sufficiently yellow to be cured of the desired colour, the man
[illegible] occasionally examining, say every ten or twelve hours to see that
it does not get hot, and also to see when it is sufficiently yellow;
then raise it on a common high scaffold sufficiently open

X5023

[illegible] the air and sun to take off the natural damps [illegible] contracted
while the Tobacco was near the ground, it may then be cured by
a continuation of hot sun or by fire, taking care not to let the
Tobacco be exposed to sun at any time after it is cut, or before
when it commences curing. If it should be necessary on
account of weather to carry the tobacco into the house before
it is sufficiently yellow, it may be [illegible] in the house until
it is in order for curing, or until the weather will permit the
low scaffold to be used.
Tobacco which has a yellowish appearance in the field when
cut, may be put on the low scaffold so soon as it is suffi-
ciently limber to pass the sticks, without either breaking or
[illegible].

If the weather is unfavorable for preparing the Tobacco for
curing, or if the manager prefers having it in the house, doors
may be prepared in a temporary way so as to keep the [illegible] of the
Tobacco from exposure to the [illegible] it becomes yellow.
The improvement in the art of curing or drying tobacco [illegible]
colour by means of [illegible] or channels dug in the floor of the house
or by raising [illegible] of [illegible], brick or stone so as to form channels
to make the [illegible], which [illegible] or channels are covered with
sheet iron or other metal.
The preferred mode is to dig three of these channels for a
house twenty feet square, six inches into the ground, and twenty
two inches wide, then raise [illegible] one foot above ground, the
channels to be covered with sheet iron or other metal two feet
wide; The metal to commence about two feet from the wall,
the two outside channels are to run about two and a half feet
from the side walls and to run within two and a half
feet of the opposite end of the house from where they commence,
& on the [illegible] ends of the two outside channels there shall
run a channel of the same size and description and covered
in the same way two and a half feet from the wall, so

X5023

[illegible] communicate with the channel running through the
centre of the house, from which communication there shall
be a flue about eight inches square running through at the
bottom of the wall to convey the smoke, this flue walls ex-
tend far enough through the wall to be safe from fire and
covered with either stone or brick.
The first [illegible] the channels where the reed is to be put in
to extend about one foot outside the wall and be covered with
with [illegible] brick or stone [illegible] the outer ends till it meets the
metal [illegible] the wall. But the number, size and
distances of these [illegible] channels [illegible] the place for the
smoke may be varied as the [illegible] of the manager may
[illegible] or the size of the house require.

Witnesses

[illegible] [illegible] [illegible] }
[illegible] [illegible] [illegible] }
[illegible]

Martin Decker
Thomas Decker.

(1000 words)

(Received 10th September 1841. & Recorded [illegible] —